(12) United States Patent
Shoda et al.

(10) Patent No.: US 10,843,664 B2
(45) Date of Patent: Nov. 24, 2020

(54) BRUSHLESS WIPER MOTOR AND METHOD FOR ASSEMBLING THE SAME

(71) Applicant: Mitsuba Corporation, Gunma (JP)

(72) Inventors: Hirokazu Shoda, Gunma (JP); Yukiyoshi Iso, Gunma (JP); Osamu Nakamura, Gunma (JP)

(73) Assignee: Mitsuba Corporation, Kiryu (JP)

( * ) Notice: Subject to any disclaimer, the term of this patent is extended or adjusted under 35 U.S.C. 154(b) by 560 days.

(21) Appl. No.: 15/324,304

(22) PCT Filed: Jul. 14, 2015

(86) PCT No.: PCT/JP2015/070111
§ 371 (c)(1),
(2) Date: Jan. 6, 2017

(87) PCT Pub. No.: WO2016/010022
PCT Pub. Date: Jan. 21, 2016

(65) Prior Publication Data
US 2017/0203722 A1    Jul. 20, 2017

(30) Foreign Application Priority Data

Jul. 15, 2014    (JP) .................................. 2014-145164

(51) Int. Cl.
*B60S 1/08*    (2006.01)
*H02K 15/14*    (2006.01)
(Continued)

(52) U.S. Cl.
CPC ................ *B60S 1/08* (2013.01); *H02K 5/225* (2013.01); *H02K 7/1166* (2013.01); *H02K 11/30* (2016.01);
(Continued)

(58) Field of Classification Search
CPC .. B60S 1/08; B62D 5/04; H02K 11/30; H02K 11/38; H02K 5/22; H02K 5/225; H02K 7/1166; H02K 15/02; H02K 15/14
(Continued)

(56) References Cited

U.S. PATENT DOCUMENTS 5,994,807 A    11/1999 Coles et al.
6,194,849 B1    2/2001 Wilson-Jones et al.
(Continued)

FOREIGN PATENT DOCUMENTS

CN    1148366 A    4/1997
DE    102012105748 A1    1/2014
(Continued)

OTHER PUBLICATIONS

Supplementary European Search Report for Serial No. EP 15 82 1699 dated Feb. 23, 2018.
(Continued)

*Primary Examiner* — Nguyen Tran
(74) *Attorney, Agent, or Firm* — McCormick, Paulding & Huber PLLC

(57) ABSTRACT

A gear side feeding terminal (73U, 73V, 73W) connected to a motor side feeding terminal (36U, 36V, 36W) provided to the end portion of a stator (32) in the axial direction of the stator (32) from the axial direction of a rotor (38) is provided on a control board (70) for controlling the rotor (38), housed in a gear case (61) so as to be stacked on a speed reduction mechanism (SD) from the direction crossing the axial direction of the rotor (38). In this manner, the wiper motor is composed of a brushless wiper motor (20), and it is unnecessary to provide the gear side feeding terminal (73U, 73V, 73W) so as to avoid the control board (70). Accordingly, it is possible to prevent electric noises, and provide a wiper motor reduced in size and weight, and since it is unnecessary
(Continued)

to form a clearance in the control board (70), it is possible to provide a wiper motor further improved in degree of freedom for designing the control board (70).

2 Claims, 14 Drawing Sheets

(51) Int. Cl.
  *H02K 21/16* (2006.01)
  *H02K 29/08* (2006.01)
  *H02K 11/38* (2016.01)
  *H02K 15/02* (2006.01)
  *H02K 11/30* (2016.01)
  *H02K 5/22* (2006.01)
  *H02K 7/116* (2006.01)
  *H02K 21/14* (2006.01)
(52) U.S. Cl.
  CPC .............. *H02K 11/38* (2016.01); *H02K 15/02* (2013.01); *H02K 15/14* (2013.01); *H02K 21/14* (2013.01); *H02K 21/16* (2013.01); *H02K 29/08* (2013.01)
(58) Field of Classification Search
  USPC .......................... 310/68 R, 68 B, 71, 83, 99
  See application file for complete search history.

(56) References Cited

U.S. PATENT DOCUMENTS

| | | | |
|---|---|---|---|
| 6,211,631 | B1 | 4/2001 | Wilson-Jones et al. |
| 2003/0173843 | A1 | 9/2003 | Sakai et al. |
| 2009/0266640 | A1 | 10/2009 | Oshima et al. |
| 2010/0101889 | A1* | 4/2010 | Yamaguchi .......... B62D 5/0406 180/444 |
| 2013/0015739 | A1 | 1/2013 | Kastinger et al. |
| 2013/0213727 | A1 | 8/2013 | Bieber et al. |
| 2015/0042215 | A1* | 2/2015 | Murakami ............... H02K 5/00 310/68 R |

FOREIGN PATENT DOCUMENTS

| | | |
|---|---|---|
| EP | 0943842 A1 | 9/1999 |
| EP | 1433975 A1 | 6/2004 |
| JP | 2000-500102 A | 1/2000 |
| JP | 2008-290616 A | 12/2008 |
| JP | 2011-223778 A | 11/2011 |
| JP | 2011-234453 A | 11/2011 |
| JP | 2011-244562 A | 12/2011 |
| JP | 2013-538744 A | 10/2013 |
| WO | 9718120 A1 | 5/1997 |
| WO | 9810971 A1 | 3/1998 |
| WO | 2010024406 A1 | 3/2010 |
| WO | 2011079982 A2 | 7/2011 |
| WO | 2013113792 | 8/2013 |

OTHER PUBLICATIONS

Supplementary European Search Report for Serial No. EP 15 82 1881 dated Feb. 26, 2018.
Supplementary European Search Report for Serial No. EP 15 82 2886 dated Feb. 20, 2018.
International Search Report for PCT Serial No. PCT/JP2015/070111 dated Sep. 24, 2015.

* cited by examiner

BRUSHLESS WIPER MOTOR AND METHOD FOR ASSEMBLING THE SAME

CROSS-REFERENCE TO RELATED APPLICATION

Applicant hereby claims foreign priority benefits under U.S.C. § 119 from International Patent Application Serial No. PCT/JP2015/070111 filed on Jul. 14, 2015 and Japanese Patent Application No. 2014-145164 filed Jul. 15, 2014, the contents of all of which are incorporated by reference herein.

TECHNICAL FIELD

The present invention relates to a brushless wiper motor which swings a wiper member provided on a windshield.

BACKGROUND ART

Conventionally, a wiper apparatus for wiping rain water, dust and the like on a windshield is mounted on a vehicle such as automotive vehicle. The wiper apparatus is provided with: a wiper member provided on a windshield; and a wiper motor for swinging the wiper member. By ON-operation of a wiper switch provided within a vehicle compartment, the wiper motor is rotated so that the wiper member is swung on the windshield so as to wipe rain water or dust on the front windshield.

Such a wiper motor is described in for example Japanese Patent application Laid-Open Publication No.: 2011-234453 (FIG. 2). The wiper motor (motor apparatus) described in Japanese Patent application Laid-Open Publication No.: 2011-234453 (FIG. 2) is provided with: a motor unit and a gear unit. The motor unit is provided with a cylindrical yoke having a bottom, permanent magnets (stator) fixed in the yoke, and an armature (rotor) having coils is rotatably provided inside the stator. In addition, driving currents are applied to the coils of the armature via brushes and commutator. In this manner, the wiper motor described in the above Japanese Patent application Laid-Open Publication No.: 2011-234453 (FIG. 2) is constituted as a motor with brushes.

On the other hand, a gear case is formed into a shape having an opening portion and a bottom, and a reduction mechanism composed of a worm and a worm wheel is housed in the gear case. Furthermore, a control board for controlling the armature is housed in the gear case. The control board is attached inside a gear cover for closing the opening portion in advance, and it is electrically connected to one end of a conductive member (feeding terminal) embedded in the gear cover. The other end of the feeding terminal embedded in the gear cover extends in a direction crossing an axial direction of the rotor with the gear cover attached to the gear case, and it is electrically connected to a feeding terminal of a brush holder while avoiding the control board.

That is, in the wiper motor described in Japanese Patent application Laid-Open Publication No.: 2011-234453 (FIG. 2), the gear case and the yoke are first coupled to each other. Then, the gear cover attached with the control board is attached to the gear case and the yoke coupled from a direction crossing in the axial direction of the rotor. In this manner, the feeding terminal embedded in the gear cover and the feeding terminal of the brush holder are electrically connected to each other, thereby resulting in completion of assembling of the wiper motor.

SUMMARY

In addition, since the wiper motors are mounted on a wide variety of vehicles including a kei car (small-sized vehicle) and a large-sized vehicle, the wiper motors are desired to be reduced in size and weight for improvement of versatility thereof. Furthermore, since various electronic devices are mounted on a vehicle or the like, it is desirable to suppress electric noises occurring during operation of the wiper motor to a maximum extent.

However, since the wiper motor described in Japanese Patent application Laid-Open Publication No.: 2011-234453 (FIG. 2) is a wiper motor with a brush, it is difficult to reduce a length of the wiper motor along the axial direction of the rotor, and size and weight reduction are limited by the brush and the commutator. Furthermore, there is a problem that the brush and the commutator generate electric noises. In addition, such a problem tends to occur that a clearance (notch) for avoiding the feeding terminal is formed on the control board in order to electrically connect the other end of the feeding terminal embedded in the gear cover to the feeding terminal of the brush holder while avoiding the control board, and the shape of the control board is complicated due to formation of the clearance, so that the degree of freedom for designing a printed wiring on the control board is lowered.

An object of the present invention is to provide a brushless wiper motor which can be reduced in size and weight while preventing electric noises from being generated, and can be further improved in degree of freedom for designing a control board.

In one aspect of the present invention, there is provided a brushless wiper motor for driving a wiper member in a swinging manner, the brushless wiper comprising: a motor case in which a stator having a coil is housed; a rotor provided inside the stator; a motor side feeding terminal provided to an end portion of the stator from an axial direction of the stator, and connected to the coil; a gear case in which a gear mechanism for transmitting rotation of the rotor to the wiper member is housed, the gear case having a flange portion to be connected to the motor case; a connector insertion hole which is formed so as to open in an axial direction of the rotor at a position offset from an axial center of the flange portion, and in which the motor side feeding terminal is inserted; a control board for controlling the rotor, the control board being housed in the gear case so as to coincide with the gear mechanism in a direction crossing an axial direction of the rotor; and a gear side feeding terminal provided on the control board and connected to the motor side feeding terminal from the axial direction of the rotor.

In another aspect of the present invention, the gear side feeding terminal is provided on one side face of the control board on the opposite side of the control board from the gear mechanism, and a rotation sensor for detecting a rotation state of the rotor is provided on the other side face of the control board on the same side of the control board as the gear mechanism.

In another aspect of the present invention, there is provided a method for assembling a brushless wiper motor for driving a wiper member in a swinging manner, the method comprising: a first step of housing a gear mechanism for transmitting rotation of a rotor to the wiper member in a gear case having a flange portion; a second step of housing a control board for controlling the rotor in the gear case so as to coincide with the gear mechanism in a direction crossing an axial direction of the rotor; and a third step of causing a motor case to face the gear case with a stator housed in the motor case, the stator having a coil, causing a motor side feeding terminal connected to the coil to be inserted into a connector insertion hole which is formed so as to open in an axial direction of the rotor at a position offset from an axial center of the flange portion, and connecting the motor side feeding terminal connected to the coil to a gear side feeding terminal provided on the control board from the axial direction of the rotor.

In another aspect of the present invention, in the first step, a worm to be rotated by the rotor and a worm wheel provided with gear teeth meshing with worm teeth of the worm are housed in the gear case.

In another aspect of the present invention, in the second step, the control board is fixed inside a gear cover for closing an opening portion of the gear case, and the opening portion is then closed by the gear cover with the control board fixed to the control board.

According to the present invention, since the gear side feeding terminal connected to the motor side feeding terminal provided to the end portion of the stator in the axial direction of the stator from the axial direction of the rotor is provided on the control board for controlling the rotor, housed in the gear case so as to be stacked on the gear mechanism from the direction crossing the axial direction of the rotor, and the wiper motor is composed of a brushless wiper motor, it is unnecessary to provide the gear side feeding terminal so as to avoid the control board. Accordingly, it is possible to prevent electric noises, and provide a wiper motor reduced in size and weight, and since it is unnecessary to form a clearance in the control board, it is possible to provide a wiper motor further improved in degree of freedom for designing the control board.

DETAILED DESCRIPTION

Hereinafter, the first embodiment of the present invention will be described with reference to the accompanying drawings.

Figure 1:
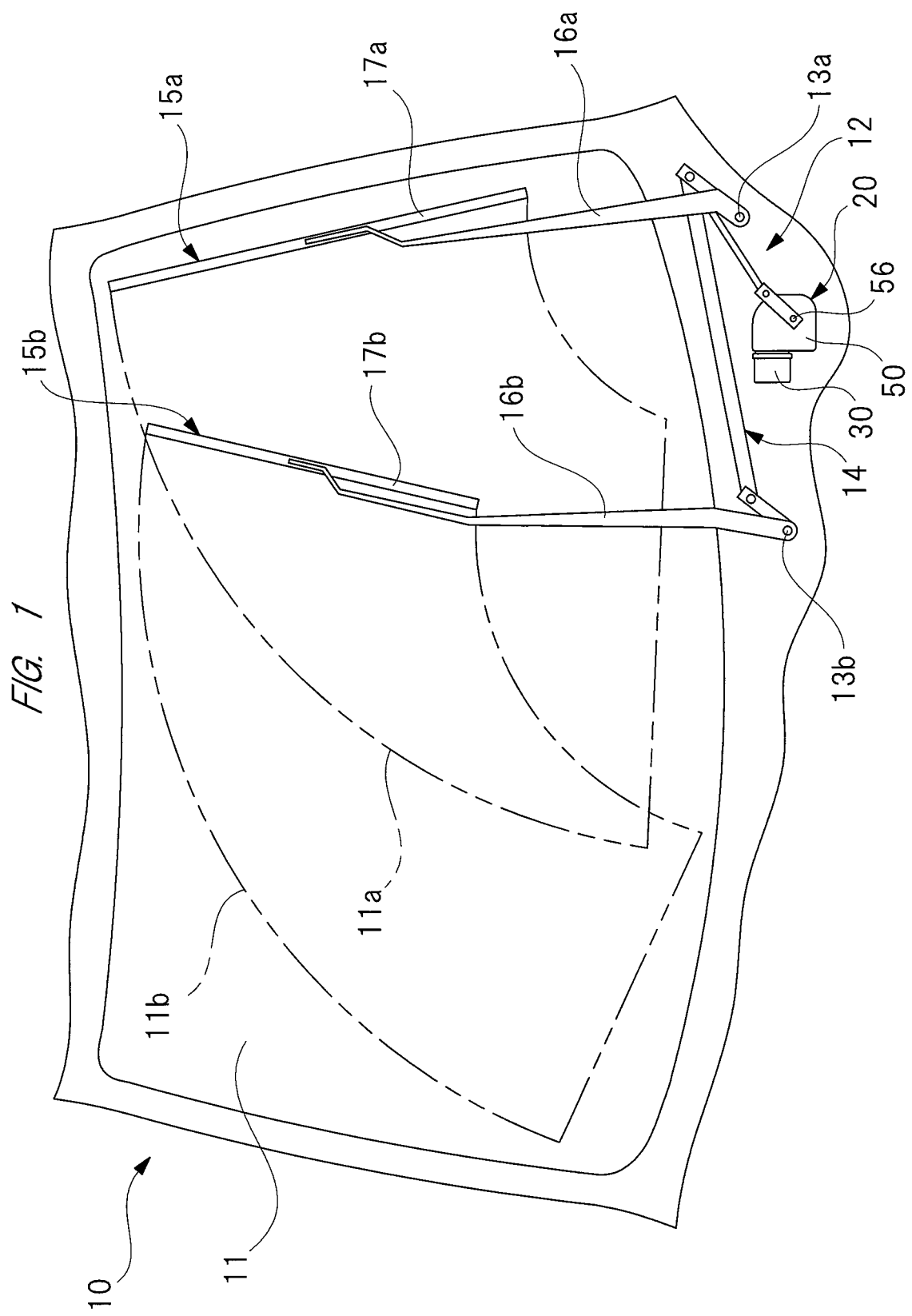
FIG. 1 is a view showing a wiper apparatus provided with a brushless wiper motor according to the present invention, and mounted on a vehicle.
Figure 2:
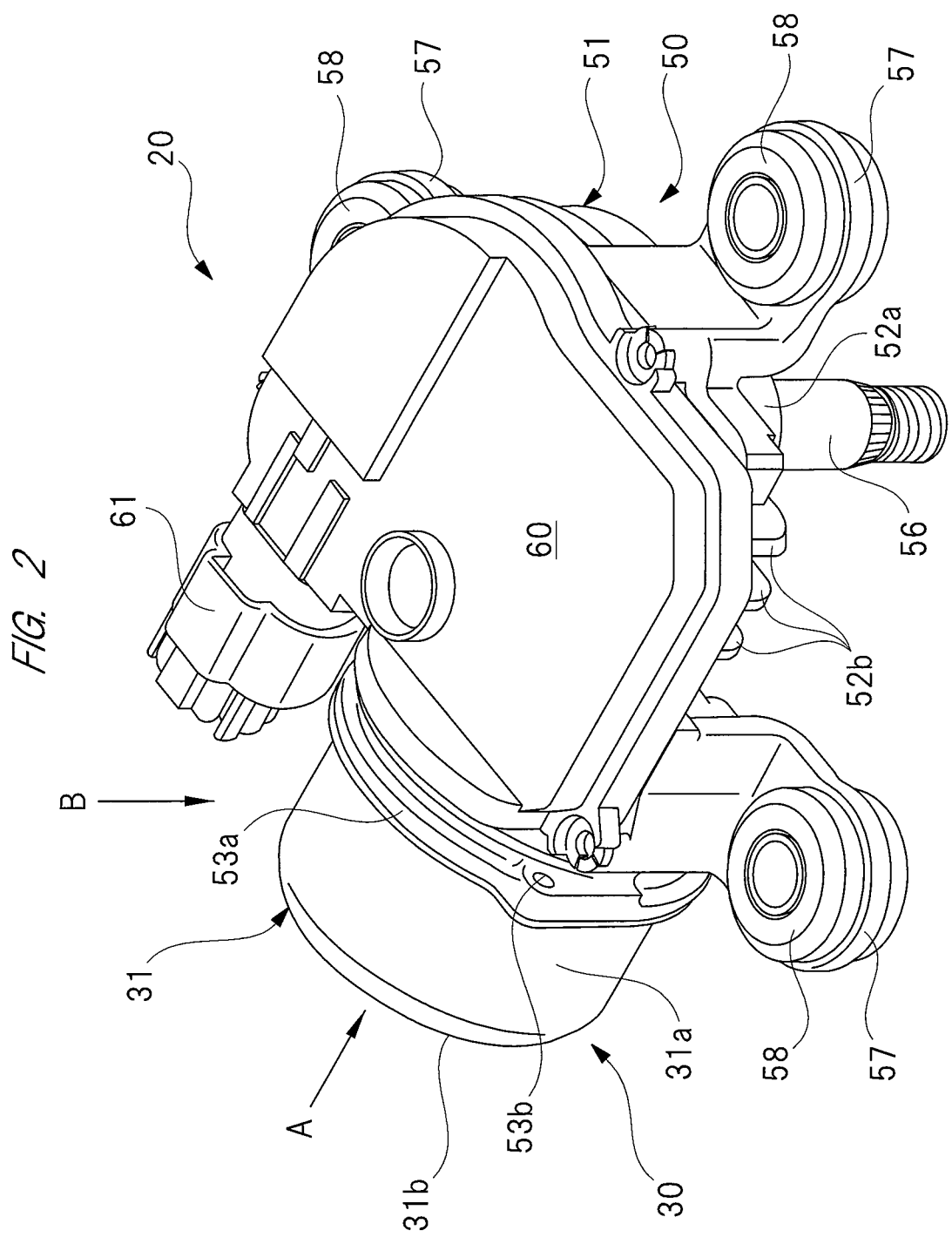
FIG. 2 is a perspective view of the brushless wiper motor, viewed from the same side as a gear cover.
Figure 3:
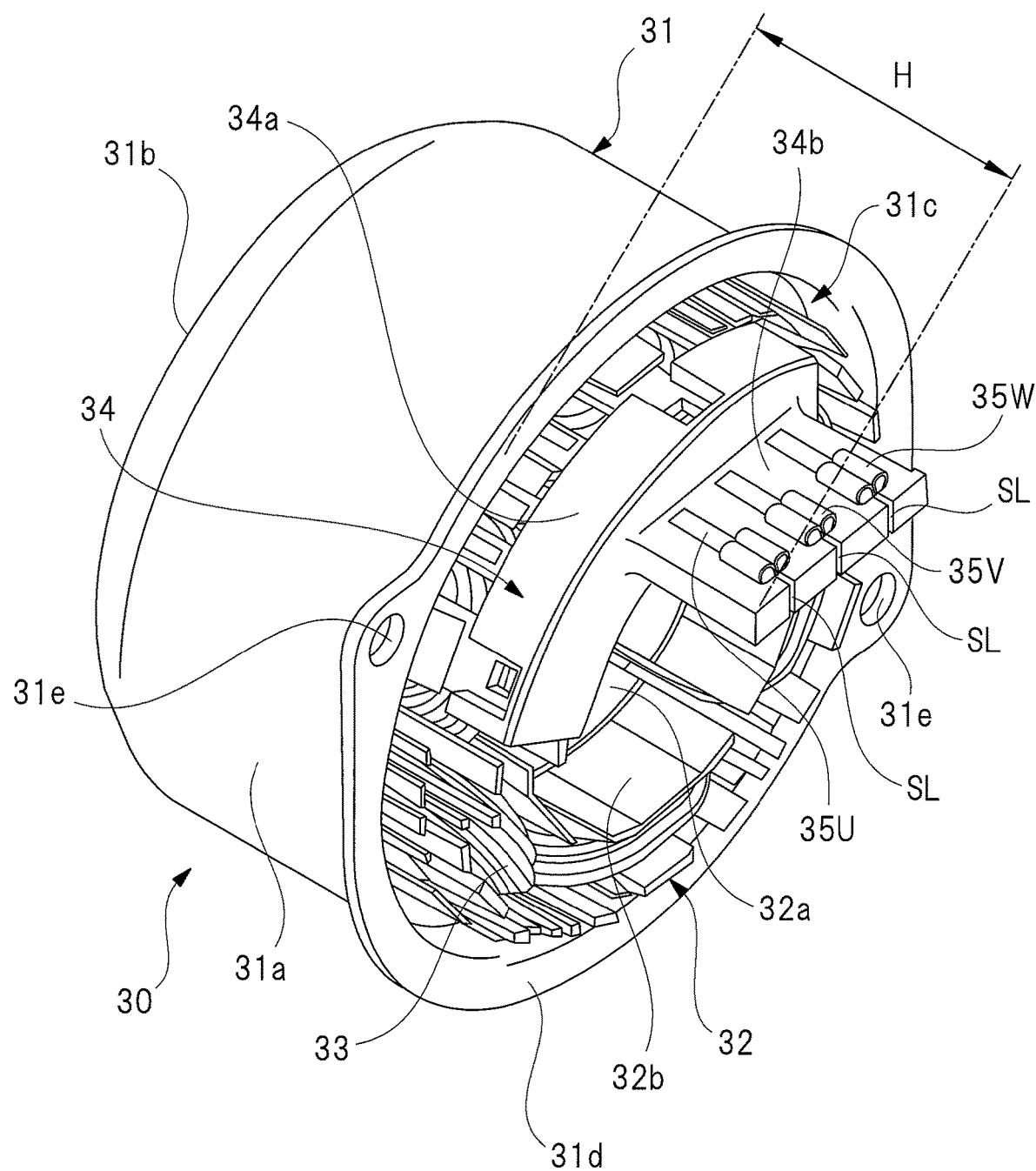
FIG. 3 is a perspective view showing a detailed structure of a stator.
Figure 4:
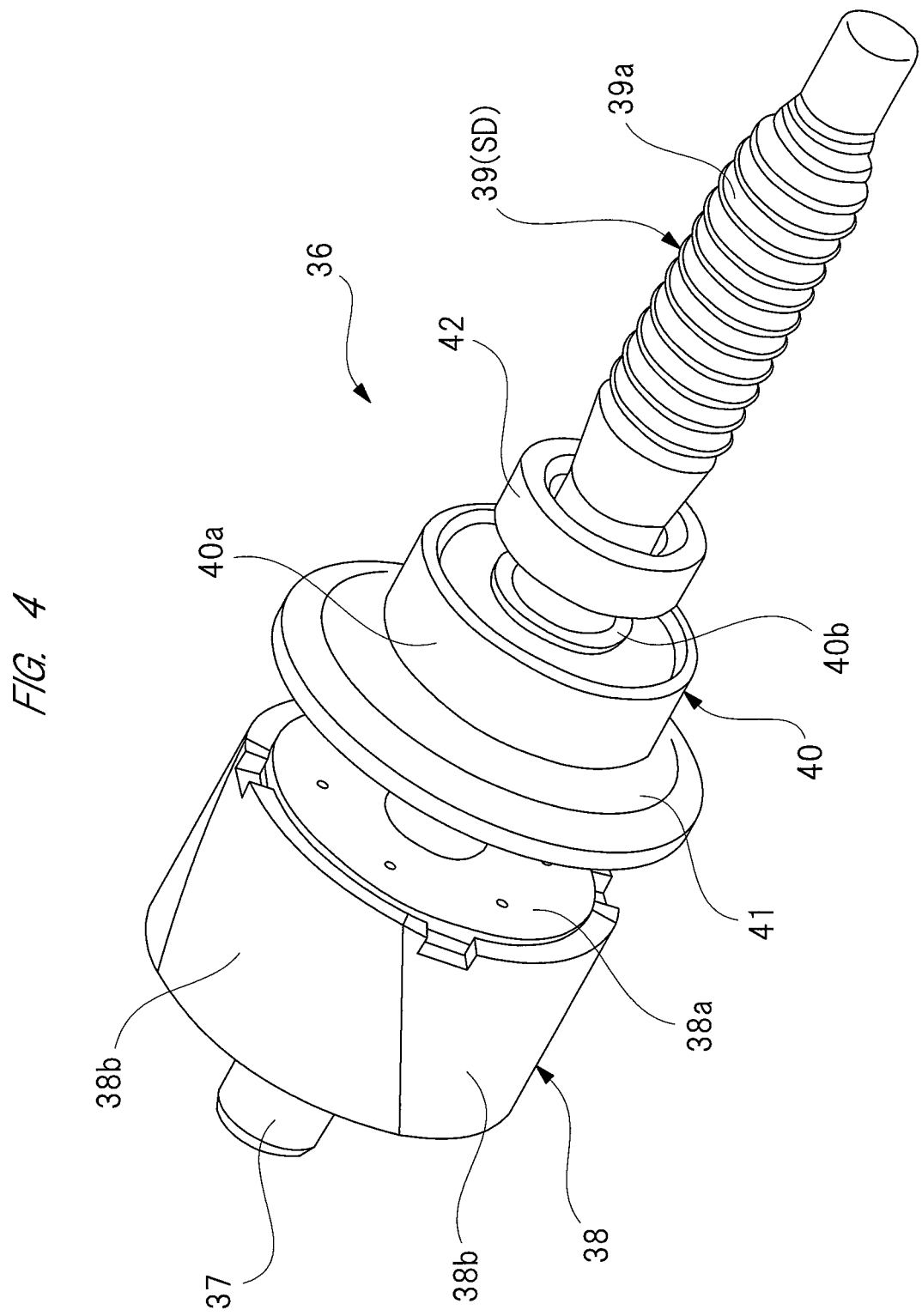
FIG. 4 is a perspective view showing a detailed structure of a rotor.
Figure 5:
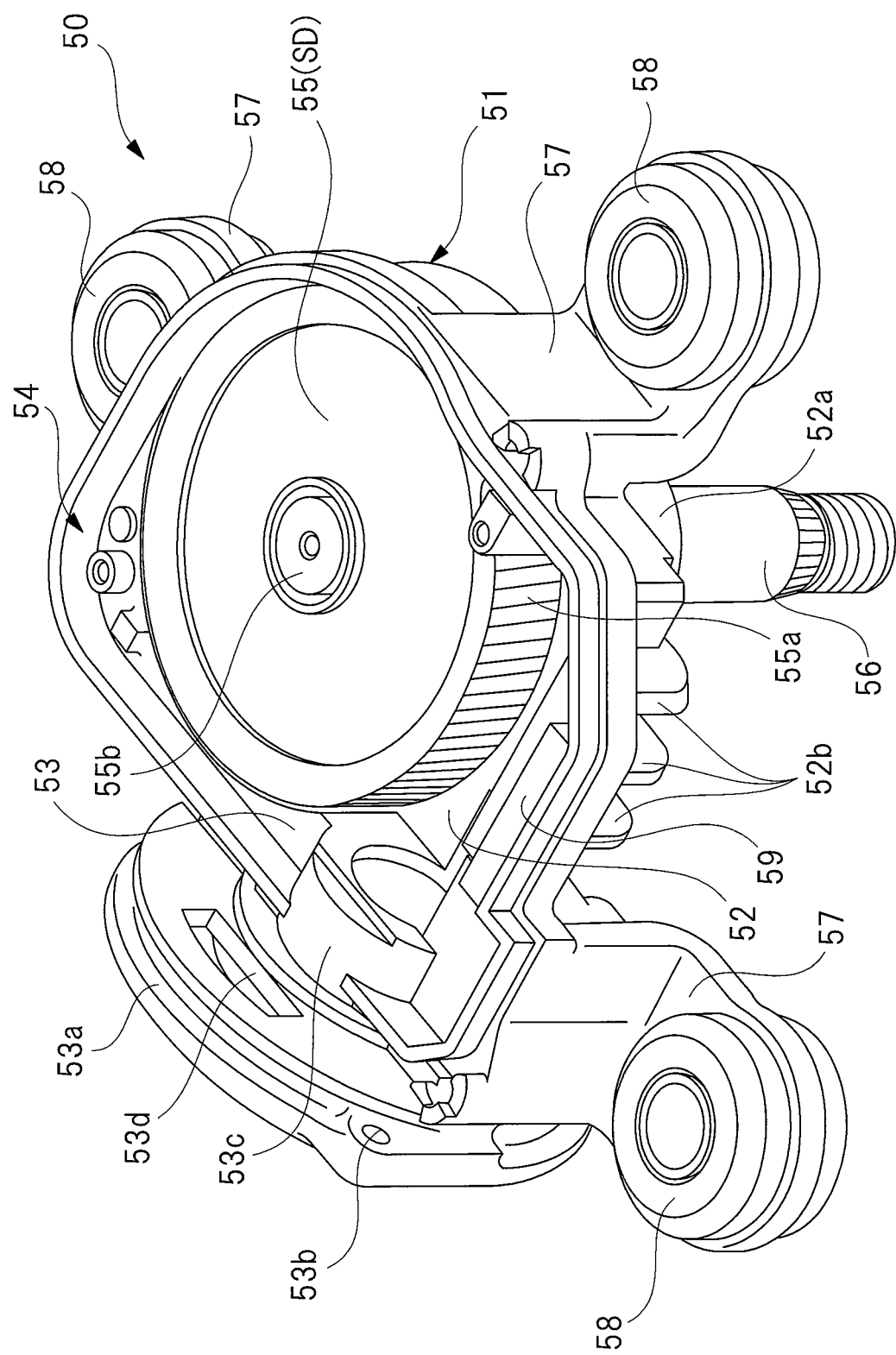
FIG. 5 is a perspective view showing a detailed structure of a gear case.
Figure 6:
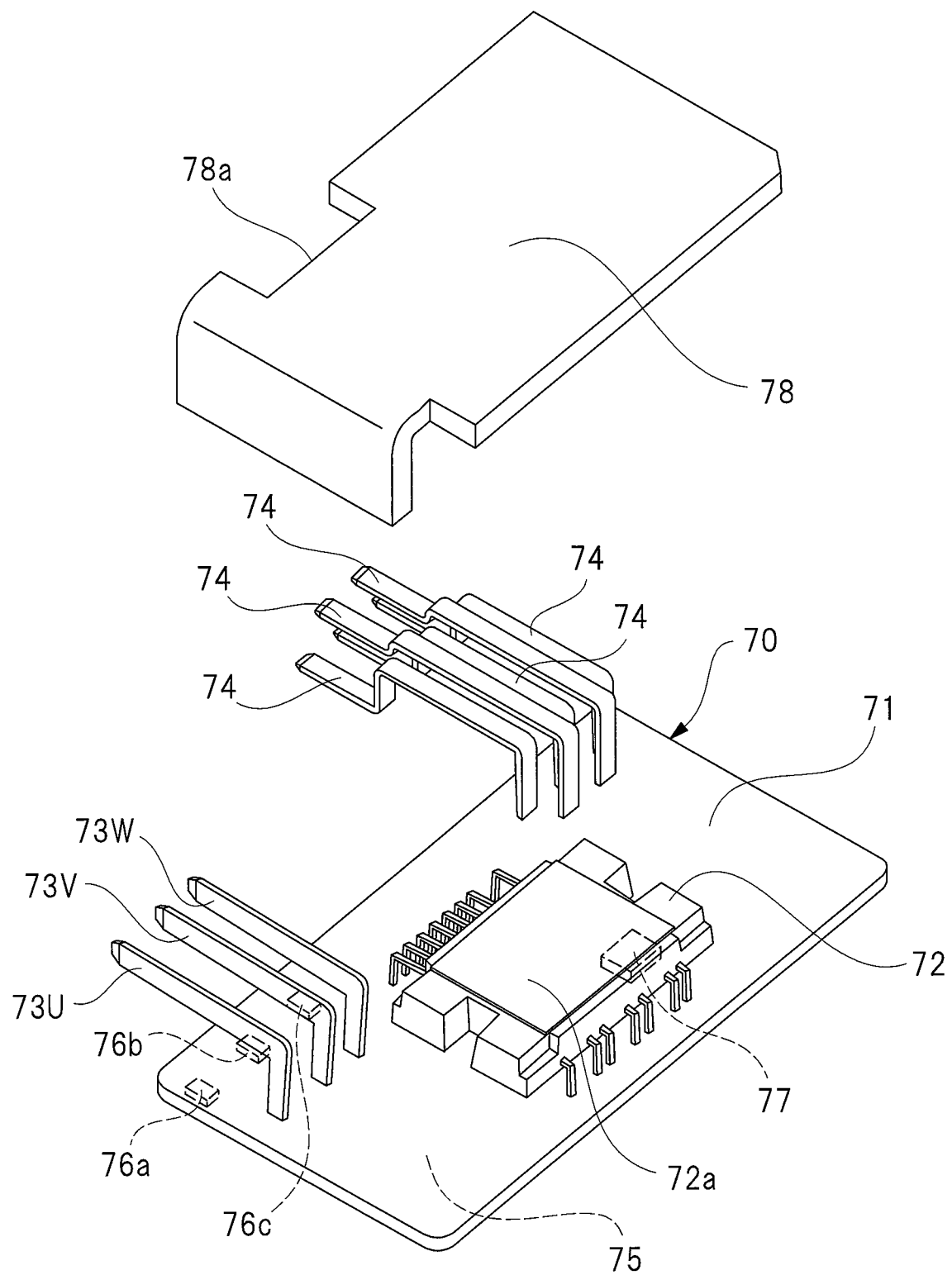
FIG. 6 is a perspective view showing detailed structures of a control board and a heat sink.

FIG. 1 is a view showing a wiper apparatus provided with a brushless wiper motor according to the present invention, and mounted on a vehicle, FIG. 2 is a perspective view of the brushless wiper motor, viewed from the same side as a gear cover, FIG. 3 is a perspective view showing a detailed structure of a stator, FIG. 4 is a perspective view showing a detailed structure of a rotor, FIG. 5 is a perspective view showing a detailed structure of a gear case, and FIG. 6 is a perspective view showing detailed structures of a control board and a heat sink.

As shown in FIG. 1, a front windshield 11 is provided on a vehicle 10 such as automotive vehicle. A wiper apparatus 12 is mounted on a front end portion of the front windshield 11 in the vehicle 10. The wiper apparatus 12 is driven by ON-operation of a wiper switch (not shown) provided within a vehicle compartment, so that extraneous matter (not shown) such as rain water or dust on the front windshield 11 can be wiped.

The wiper apparatus 12 is provided with: a brushless wiper motor 20; a power transmission mechanism 14 for transmitting swinging motion of the brushless wiper motor 20 to pivot shafts 13a and 13b; and a pair of wiper members 15a and 15b in which proximal sides thereof are respectively fixed to the pivot shafts 13a and 13b, and distal end sides thereof perform reciprocal wiping actions on the front windshield 11 according to swinging motions of the respective pivot shafts 13a and 13b.

The wiper members 15a and 15b are respectively provided so as to correspond to a driver's seat side and a passenger's seat side. The wiper members 15a and 15b are respectively composed of wiper arms 16a and 16b, and wiper blades 17a and 17b attached to the wiper arms 16a and 16b.

By rotationally driving the brushless wiper motor 20, a swinging motion of the brushless wiper motor 20 is transmitted to the pivot shafts 13a and 13b via the power transmission mechanism 14. Therefore, the pivot shafts 13a and 13b are respectively driven in a swinging manner. Thus, a driving force of the brushless wiper motor 20 is transmitted to the wiper members 15a and 15b, so that extraneous matters attached within ranges 11 *a* and 11 *b* of the front windshield 11 are wiped by the wiper blades 17a and 17b.

As shown in FIGS. 2 to 6, the brushless wiper motor 20 is provided with a motor unit 30 and a gear portion 50. The motor unit 30 and the gear portion 50 are coupled to each other by a pair of fastening screws (not shown).

As shown in FIG. 3, the motor unit 30 is provided with a motor case 31 formed into a cylindrical shape with a bottom by performing a pressing (deep drawing) or the like to a steel plate. The motor case 31 is provided with a cylindrical main body 31a, and one end side (left side in FIG. 3) of the cylindrical main body 31a in an axial direction thereof is closed by a circular bottom portion 31b (not shown in detail). On the other hand, an opening portion 31c is provided on the other end side (right side in FIG. 3) of the cylindrical main body 31a in the axial direction, and a flange portion 31d projecting from the cylindrical main body 31a in a radially outward direction is provided around the opening portion 31c. The flange portion 31d is caused to abut on a flange portion 53a (see FIG. 5) of a gear case 51. A pair of screw holes 31e is provided in the flange portion 31d, and opposed to each other through an axial center of the cylindrical main body 31a, and fastening screws are respectively inserted into the screw holes 31e.

A stator 32 is housed in the cylindrical main body 31a. The stator 32 is firmly fixed to the cylindrical main body 31a by a bonding agent of epoxy resin (not shown) so that those members cannot be rotated with respect to each other. The stator 32 is formed into an approximately cylindrical shape by stacking a plurality of steel plates 32a made of magnetic material (not shown in detail). Furthermore, coil bobbins 32b (only one is shown in FIG. 3) made of resin which is insulator are provided on respective end sides of the stator 32 in the axial direction. U-phase, V-phase and W-phase (3-phase) coils 33 are wounded around the coil bobbin 32b with a predetermined number of windings. End portions (not shown) of the U-phase, V-phase and W-phase coils 33 are electrically connected inside a coil end collecting member 34 so as to constitute a star connection (Y connection). However, a connecting method of the coils 33 is not limited to the star connection, but another connecting method such as delta connection (triangular connection) or the like can be adopted.

Driving currents are supplied to the respective coils 33 from an FET module 72 (see FIG. 6) mounted on a control board 70 via the coil end collecting member 34 at predetermined timings. Therefore, an electromagnetic force is generated in the stator 32, a rotor 38 (see FIG. 4) provided inside the stator 32 is rotationally driven in a predetermined rotation direction with a predetermined driving torque.

The coil end collecting member 34 is formed into a predetermined shape from insulating material such as plastic or the like, and provided on the other end portion (right side in FIG. 3) of the stator 32 in the axial direction. The coil end collecting member 34 is provided with a body portion 34a formed into an approximately arc shape, and one end portions of the U-phase, V-phase and W-phase coils 33 are respectively collected and electrically connected inside the body portion 34a. Furthermore, the body portion 34a is arranged on the same side as the opening portion 31c of the motor case 31, and a motor connector portion 34b is integrally provided on the body portion 34a so as to project in the axial direction of the stator 32. The motor connector portion 34b is formed into an approximately parallelepiped shape, and three motor side feeding terminals 35U, 35V and 35W corresponding to the U-phase, V-phase and W-phase coils 33 are embedded in the motor connector portion 34b.

Here, one end sides of the motor side feeding terminals 35U, 35V and 35W in longitudinal directions thereof are electrically respectively connected to the U-phase, V-phase and W-phase coils 33 inside the body portion 34a. On the other hand, the other end sides of the motor side feeding terminals 35U, 35V and 35W in the longitudinal directions constitute female type terminals, and they are electrically respectively connected to the gear side feeding terminals 73U, 73V and 73W (male type terminals) of the control board 70 from the axial direction of the rotor 38. Here, slits SL for guiding connections of the gear side feeding terminals 73U, 73V and 73W to the motor side feeding terminals 35U, 35V and 35W are respectively provided on the opposite side of the motor connector portion 34b from the body portion 34a.

A projecting height of the motor connector portion 34b from the motor case 31 is set to a predetermined height "H". Because of this height "H", with the motor case 31 attached to the gear case 51, the other end sides of the motor side feeding terminals 35U, 35V and 35W in the longitudinal direction are arranged inside the gear case 51 beyond a bearing attaching portion 53c (see FIG. 5) of the gear case 51.

A rotor assembly 36 shown in FIG. 4 is rotatably provided inside the motor unit 30 and the gear portion 50. The rotor assembly 36 is provided with a rotation shaft 37 at a rotation center thereof, and the rotor 38 is fixed to the rotor assembly 36 on the same side (left side in FIG. 4) as the motor unit 30 along an axial direction of the rotation shaft 37. On the other hand, a worm 39 forming part of a reduction mechanism SD in cooperation with a worm wheel 55 is provided on the rotor assembly 36 on the same side (right side in FIG. 4) as the gear portion 50 along the axial direction of the rotation shaft 37. That is, the worm 39 is rotated by the rotor 38. Incidentally, the worm 39 is provided with spiral worm teeth 39a meshed with gear teeth 55a of the worm wheel 55.

The rotor 38 is formed into an approximately cylindrical shape by stacking a plurality of steel plates 38a (only one steel plate is shown in FIG. 4) made of magnetic material, and an inside portion of the rotor 38 in a radial direction thereof is fixed to an outer peripheral portion of the rotation shaft 37. A plurality of permanent magnets 38b formed into an arc shape in transverse section are fixed to surfaces of the steel plates 38a. The rotor 38 is rotatably provided inside the stator 32 (see FIG. 3) via a predetermined clearance (air gap).

The permanent magnets 38a are arranged at equal intervals (at intervals of 90°) such that polarities are alternated along a circumferential direction of the rotor 38. Thus, the brushless wiper motor 20 (see FIG. 2) constitutes a brushless motor having an SPM (surface permanent magnet) structure in which the permanent magnets 38a are attached to the surface of the rotor 38. However, the present invention is not limited to the brushless motor having an SPM structure, but a brushless motor having an IPM (interior permanent magnet) structure in which permanent magnets are embedded in the rotor 38 may be adopted.

A ball bearing 40 attached to the bearing attaching portion 53c (see FIG. 5) of the gear case 51 is provided at an approximately central portion of the rotation shaft 37 along the axial direction thereof. Here, the ball bearing 40 is provided with an outer wheel 40a and an inner wheel 40b, and the outer wheel 40a is fixed to the bearing attaching portion 53c by a pressing force of an annular stopper spring 41. Here, the stopper spring 41 together with the ball bearing 40 is fixed inside the bearing attaching portion 53c.

On the other hand, the inner wheel 40b of the ball bearing 40 is fixed to an approximately central portion of the rotation shaft 37 in the axial direction by a retaining ring, a caulking or the like (not shown). That is, by fixing the ball bearing 40 to the bearing attaching portion 53c, the rotation shaft 34 is made immovable to the gear case 51 in the axial direction. Therefore, the rotation shaft 37 is prevented from wobbling in the axial direction inside the motor case 31 and the gear case 51, thereby resulting in smooth rotation of the rotation shaft 37.

A first sensor magnet 42 is fixed between the worm 39 and the ball bearing 40 along the axial direction of the rotation shaft 37. The first sensor magnet 42 is formed into an annular shape, and magnetized so that its polarities alternately appear in a circumferential direction of the first sensor magnet 42. Here, the first sensor magnet 42 is used to detect rotation states of the rotation shaft 37, namely, a rotation speed, a rotation direction or the like.

As shown in FIG. 5, the gear portion 50 is provided with the gear case 51 formed into an approximately bathtub shape having a bottom by performing casting or the like to aluminum material. The gear case 51 is provided with a bottom portion 52, a side wall portion 53, and an opening portion 54. The worm wheel 55 is rotatably housed in the gear case 51. The worm wheel 55 is formed of synthetic resin such as POM (polyacetal) plastic or the like in an approximately circular plate shape, and the worm wheel 55 has an outer peripheral portion formed with gear teeth 55*a*. The worm teeth 39*a* (see FIG. 4) of the worm 39 are meshed with the gear teeth 55*a* of the worm wheel 55. The worm wheel 55 and the worm 39 collectively constitute the gear mechanism in the present invention, and form the reduction mechanism SD for reducing a rotation speed of the rotation shaft 37 (see FIG. 4).

A proximal end side of an output shaft 56 is fixed to an axial center of the worm wheel 55, and the output shaft 56 is rotatably supported by a boss portion 52*a* provided on the bottom portion 52 of the gear case 51. A distal end side of the output shaft 56 extends outside the gear case 51 and the power transmission mechanism 14 (see FIG. 1) is fixed to a distal end portion of the output shaft 56. In this manner, the rotation speed of the rotation shaft 37 is reduced by the reduction mechanism SD, so that an output subjected to a high torque by reduction in speed is transmitted from the output shaft 56 to the power transmission mechanism 14. Therefore, the wiper members 15*a* and 15*b* (see FIG. 1) are driven in a swinging manner. Thus, the reduction mechanism SD transmits rotation of the rotor 38 (rotation shaft 37) to the wiper members 15*a* and 15*b* via the power transmission mechanism 14.

A second sensor magnet 55*a* formed into an approximately circular plate shape is attached to the axial center of the worm wheel 55 on the side opposite to the output shaft 56. The second sensor magnet 55*b* is magnetized such that one side of the second sensor magnet 55*b* and the other side thereof regarding the axial center of the worm wheel 55 are different in polarity from each other. Here, the second sensor magnet 55*b* is used to detect the rotation position of the worm wheel 55, namely swung positions of the respective wiper members 15*a* and 15*b* to the front windshield 11.

A flange portion 53*a* formed into an approximately circular plate shape is formed at a region of the side wall portion 53 of the gear case 51 close to the motor unit 30 (left side in FIG. 5). The flange portion 53*a* is caused to abut on the flange portion 31*d* (see FIG. 3) of the motor case 31 to be connected to the motor unit 30. Incidentally, female screw portions 53*b* are provided in the flange portion 53*a*, and fastening screws (not shown) for fixing the motor unit 30 and the gear portion 50 to each other is coupled to the female screw portions 53*b* in a screwing manner.

A bearing attaching portion 53*c* to be attached with the outer wheel 40*a* (see FIG. 4) of the ball bearing 40 is provided at the axial center of the flange portion 53*a*. The bearing attaching portion 53*c* is formed into an approximately cylindrical shape to extend through the side wall portion 53. Therefore, in a process of assembling the brushless wiper motor 20, the worm 39 of the rotation shaft 37 can be arranged inside the gear case 51 via the bearing attaching portion 53*c*.

A connector insertion hole 53*d*, in which the motor connector portion 34*b* (see FIG. 3) of the coil end collecting member 34 is inserted, is formed at a position offset from the axial center of the flange portion 53*a*, and in a region of the output shaft 56 outside the opening portion 54 along the axial direction of the output shaft 56. The motor connector portion 34*b* is inserted into the connector insertion hole 53*d* from the axial direction of the rotation shaft 37 at an assembling time of the brushless wiper motor 20.

Three attaching legs 57 are integrally provided on the side wall portion 53 of the gear case 51, and rubber bushes 58 are respectively attached to these attaching legs 57. Therefore, with the brushless wiper motor 20 mounted on the vehicle 10 (see FIG. 1), vibrations of the brushless wiper motor 20 are hard to be transmitted to the vehicle 10. Furthermore, in addition, vibrations of the vehicle 10 are hard to be transmitted to the brushless wiper motor 20.

Three cooling fins 52*b* are integrally provided on an outside of the bottom portion 52 of the gear case 51. Furthermore, a first heat transfer sheet 59 is bonded on the bottom portion 52 corresponding to these cooling fins 52*b*. A heat sink 78 (see FIG. 6) having one end side connected to the FET module 72 is caused to abut on the first heat transfer sheet 59 bonded to the bottom portion 52 through the other end side of the heat sink 78. That is, heat of the FET module 72 elevated due to switching operations are dissipated rapidly outside through the heat sink 78 and the respective cooling fins 52*b*. Therefore, heat radiation performance of the whole control board 70 is improved effectively.

The opening portion 54 of the gear case 51 is closed in a sealed state by a gear cover 60 (see FIG. 2) made of synthetic resin such as plastic or the like. The gear cover 60 is fixed to the gear case 51 by three fastening screws (not shown). As shown in FIG. 6, the control board 70 for controlling rotation of the rotor 38 is fixed inside the gear cover 60. The control board 70 is electrically connected to a vehicle-mounted battery (not shown) and a wiper switch via an external connector (not shown) provided on the vehicle 10, which is connected to a connector connection portion 61 (see FIG. 2) provided on the gear cover 60.

The control board 70 is formed into an approximately rectangular shape which is simple, thereby improving the degree of freedom regarding designing a printed wiring or the like (not shown). The FET module (switching element) 72 switching-operated at a high speed by a CPU (not shown) is mounted on one side face 71 (upper face in FIG. 6) of the control board 70 on the side opposite to the reduction mechanism SD.

Furthermore, three gear side feeding terminals 73U, 73V and 73W (male type terminals) formed into an approximately L-shape are mounted on the one side face 71 of the control board 70. Distal end sides (left side in FIG. 6) of the gear side feeding terminals 73U, 73V and 73W are opposed to the connector insertion hole 53*d* (see FIG. 5) with the control board 70 housed in the gear case 51. Therefore, when assembling is performed by plugging the motor connector portion 34*b* into the connector insertion hole 53*d*, the motor side feeding terminals 35U, 35V and 35W (see FIG. 3) are electrically connected to the respective gear side feeding terminals 73U, 73V and 73W.

Five external connector connection terminals 74 formed into an approximately L-shape are further formed on the one side face 71 of the control board 70. These external connector connection terminals 74 are connected to an external connector (not shown) on the side of the vehicle 10 and are electrically connected to a vehicle-mounted battery, a wiper switch and the like.

Three first rotation detecting sensors 76*a*, 76*b* and 76*c* serving as rotation sensors and detecting rotation states, namely, a rotation speed, a rotation direction, or the like of the rotor 38 (rotation shaft 37) are mounted on the other side face 75 (lower face in FIG. 6) of the control board 70 on the same side as the reduction mechanism SD. In this embodiment, Hall sensors (Hall ICs) for detecting magnetic field are used as the first rotation detecting sensors 76*a*, 76*b* and 76*c*. The first rotation detecting sensors 76*a*, 76*b* and 76*c* are respectively arranged close to the gear feeding terminals 73U, 73V and 73W, and so as to face the first sensor magnet 42 (see FIG. 4) fixed to the rotation shaft 37. Therefore, pulse signals are outputted at predetermined timings from the respective first rotation detecting sensors 76*a*, 76*b* and 76*c* according to rotation of the first sensor magnet 42. Incidentally, the pulse signals from the first rotation detecting sensors 76*a*, 76*b* and 76*c* are respectively fed to the CPU.

In addition, one second rotation detecting sensor 77 for detecting a rotation position of the worm wheel 55, namely, swinging positions of the wiper members 15*a* and 15*b* to the front windshield 11 is mounted on the other side face 75 of the control board 70. A magnetoresistance element (MR sensor) detecting a magnetic field is used as the second rotation detecting sensor 77. The second rotation detecting sensor 77 is arranged close to a central portion of the control board 70, and so as to face a second sensor magnet 55*b* (see FIG. 5) fixed to the worm wheel 55. Therefore, a pulse-like voltage signal is fed from the second rotation detecting sensor 77 according to rotation of the second sensor magnet 55*b*. Incidentally, the voltage signal from the second rotation detecting sensor 77 is fed out to the CPU.

As shown in FIG. 6, a second heat transfer sheet 72*a* is bonded to a surface of the FET module 72. One end side (right side in FIG. 6) of the heat sink 78 is caused to abut on the second heat transfer sheet 72*a*. Here, the heat sink 78 is formed into a predetermined shape by punching a plate material made of aluminum having a high thermal conductivity, and arranged between the FET module 72 and the cooling fins 52*b* (see FIG. 5). Furthermore, a notch portion 78*a* formed into an approximately rectangular shape is formed in the heat sink 78. The notch portion 78*a* is used for avoiding contact between the heat sink 78 and the gear side feeding terminals 73U, 73V and 73W with the heat sink 78 attached to the FET module 72 (see FIG. 9).

Next, an assembling method of the brushless wiper motor 20 constructed as above will be described in detail with reference to the drawings.

Figure 7:
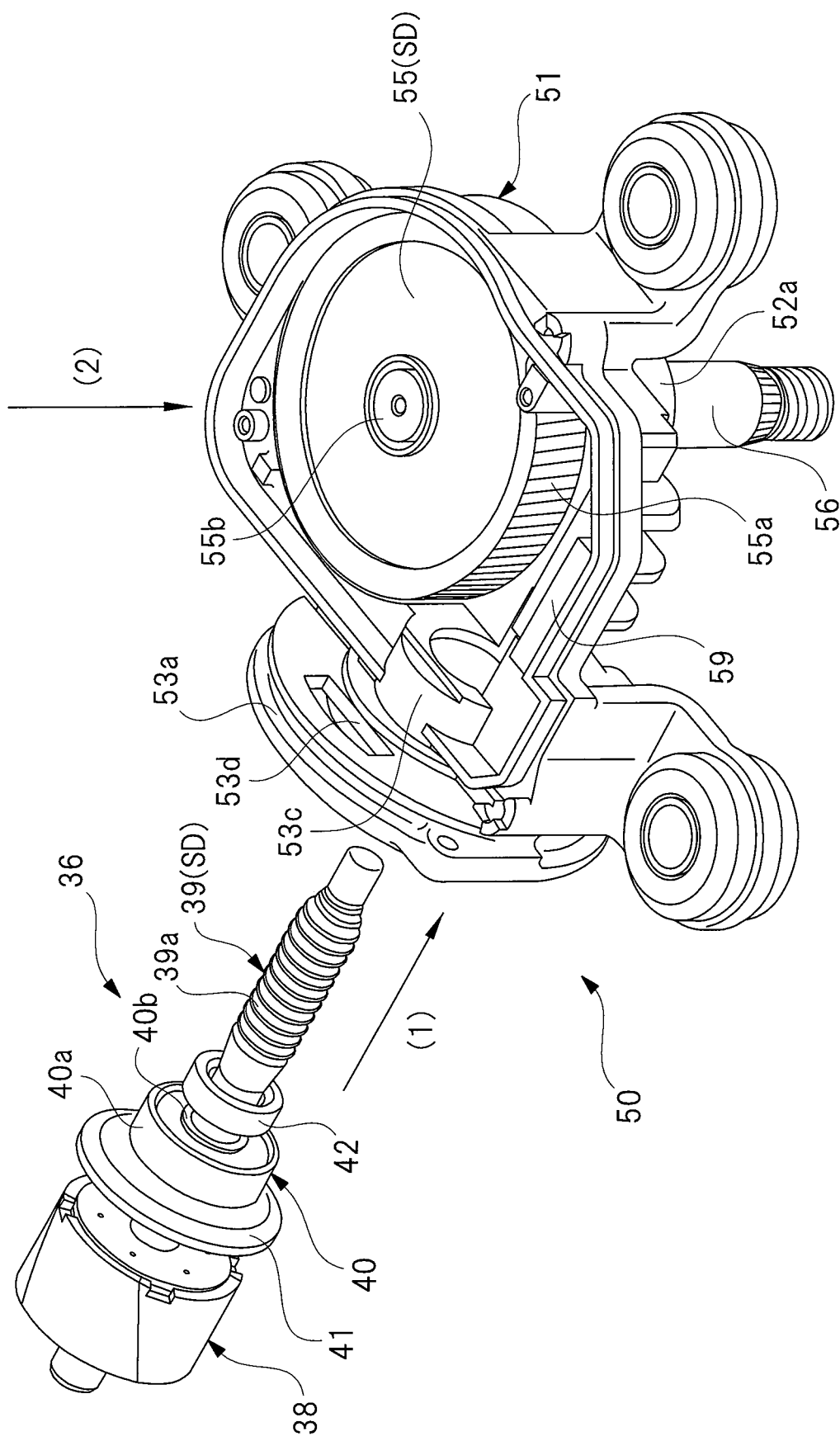
FIG. 7 is an explanatory view explaining an assembling step of the gear case.
Figure 8:
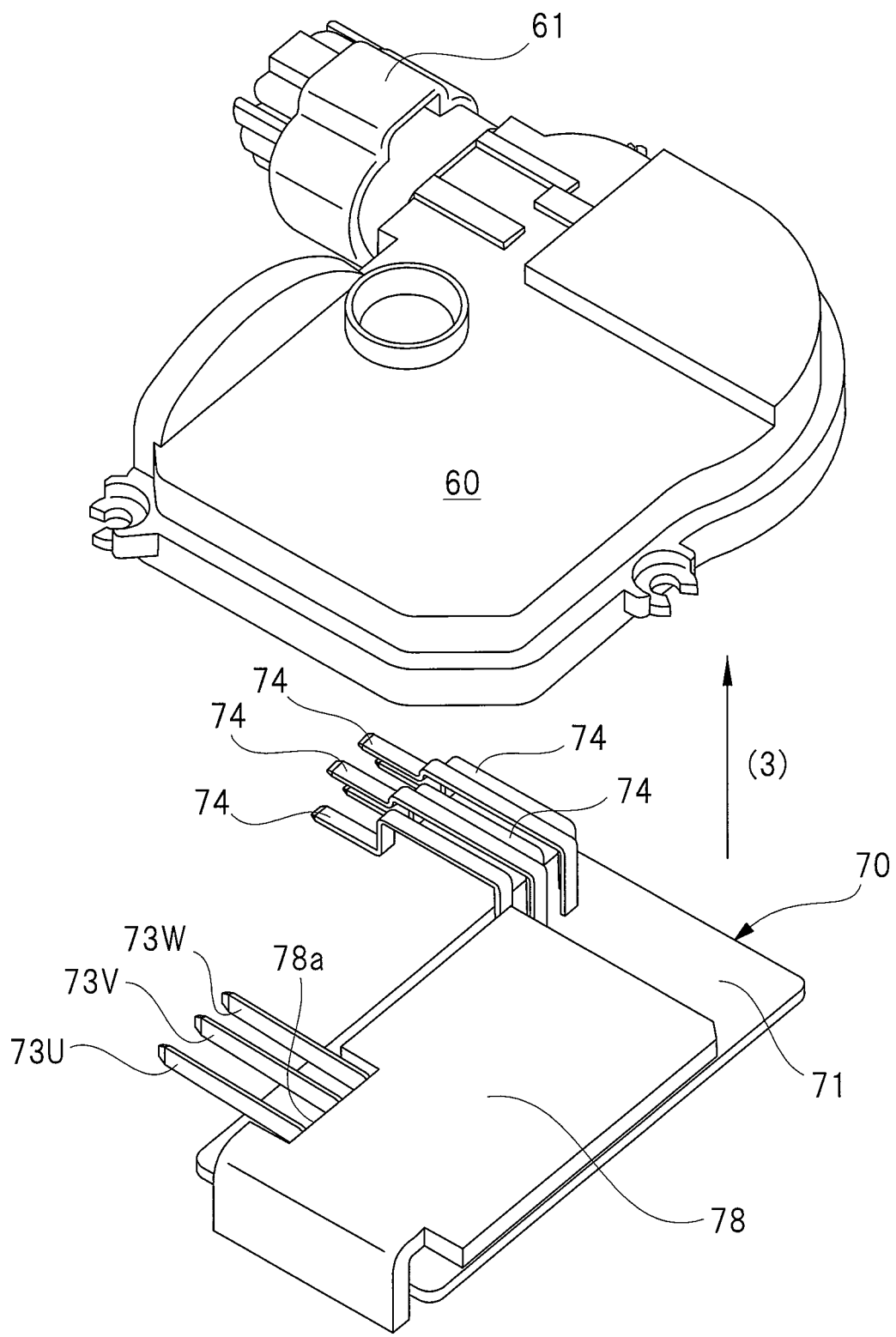
FIG. 8 is an explanatory view explaining an assembling step of the gear cover.
Figure 9:
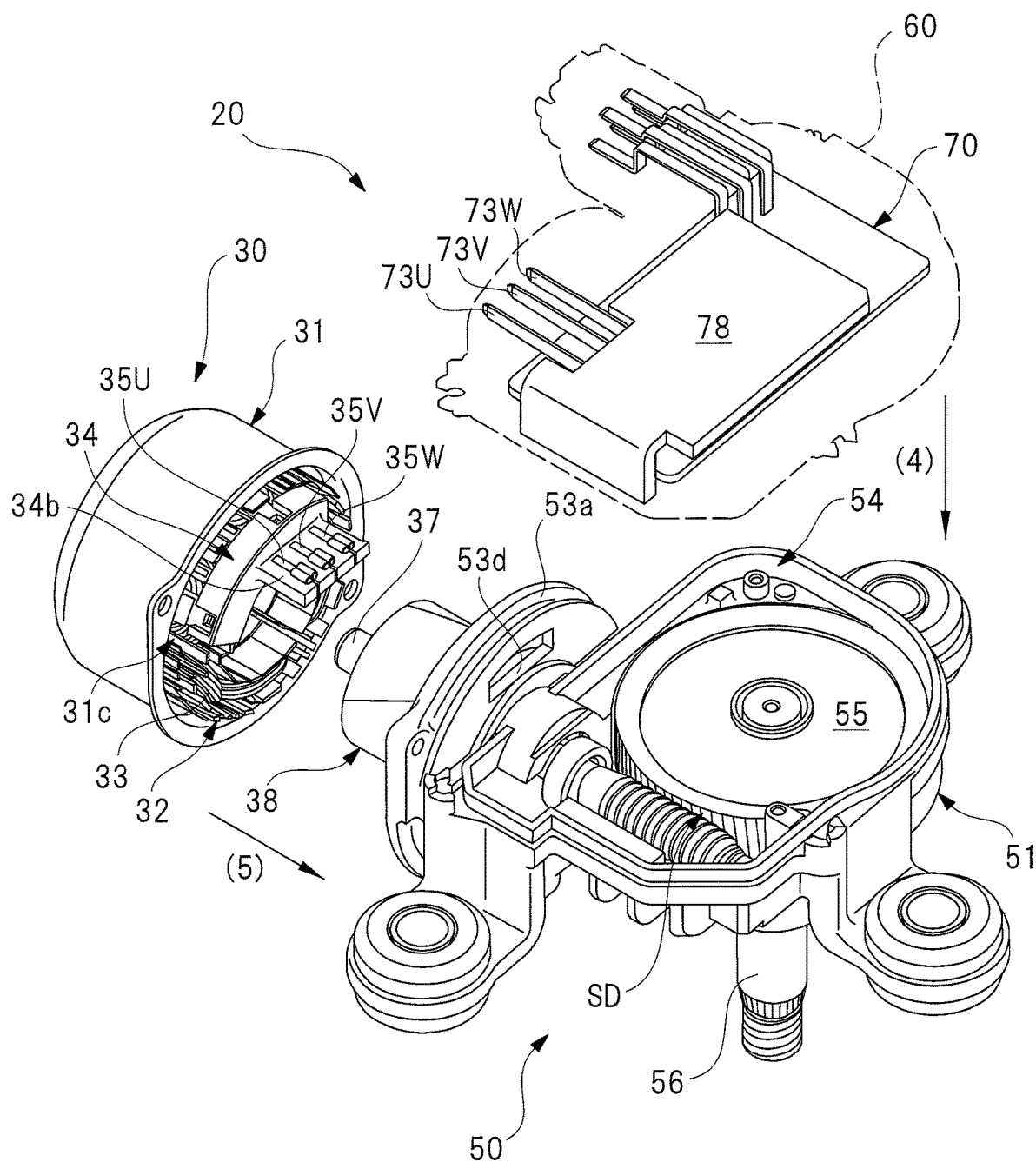
FIG. 9 is an explanatory view explaining an assembling step of a motor unit and the gear cover.
Figure 10:
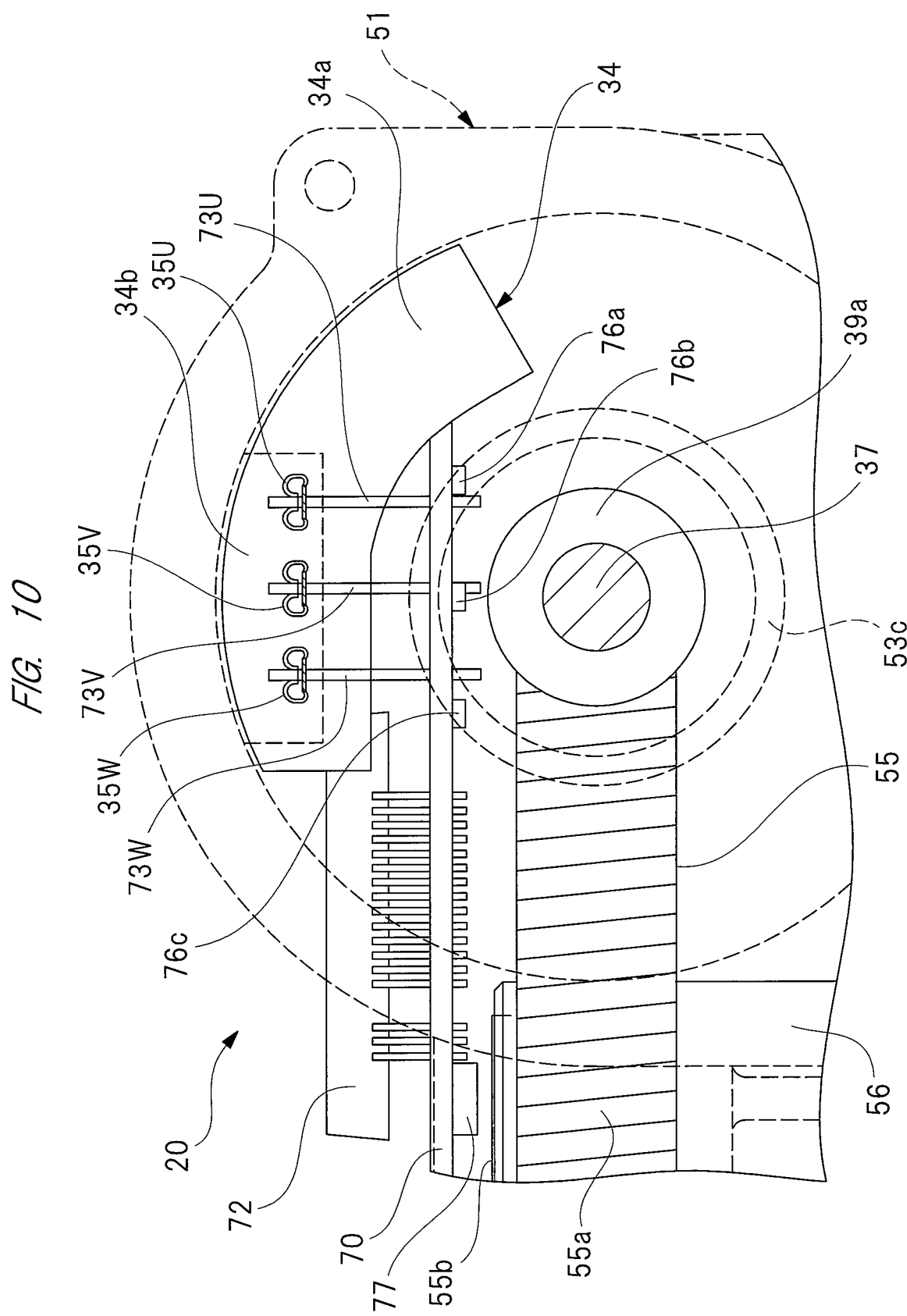
FIG. 10 is a view explaining a positional relationship among a rotation shaft, the control board and a motor connector portion, as viewed from a direction of arrow A in FIG. 2.
Figure 11:
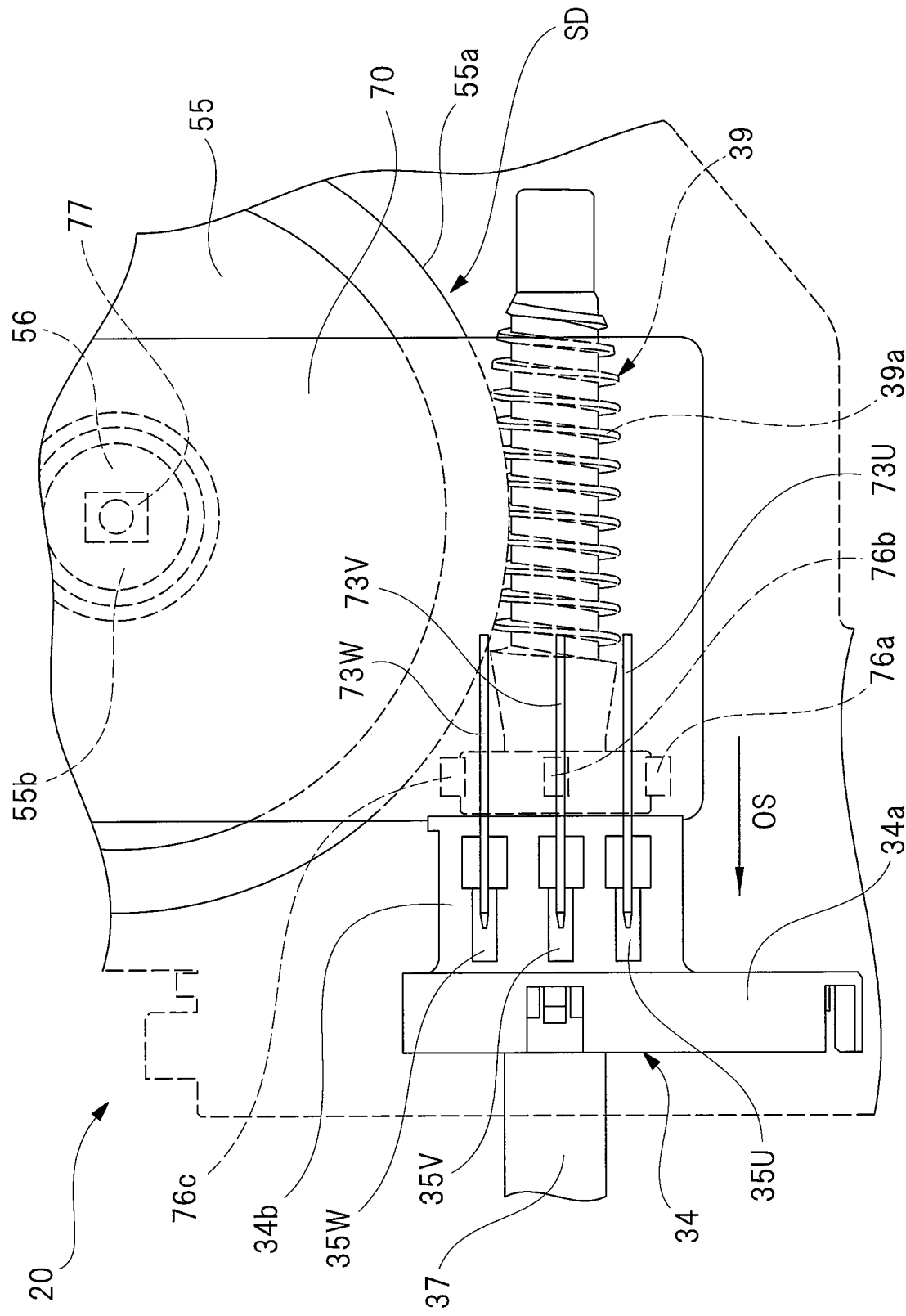
FIG. 11 is a view explaining the positional relationship among the rotation shaft, the control board and a motor connector portion, as viewed from a direction of arrow B in FIG. 2.

FIG. 7 is an explanatory view explaining an assembling step of the gear case, FIG. 8 is an explanatory view explaining an assembling step of the gear cover, FIG. 9 is an explanatory view explaining an assembling step of a motor unit and the gear cover, FIG. 10 is a view explaining a positional relationship among a rotation shaft, the control board and a motor connector portion, as viewed from a direction of arrow A in FIG. 2, and FIG. 11 is a view explaining the positional relationship among the rotation shaft, the control board and a motor connector portion, as viewed from a direction of arrow B in FIG. 2.

[First Step]

In a first step, a work for housing the reduction mechanism SD for transmitting rotation of the rotor 38 to the wiper members 15*a* and 15*b* (see FIG. 1) in the gear case 51 is performed.

First of all, the gear case 51 manufactured in another manufacturing step, the rotor assembly 36 assembled in another assembling step, and the worm wheel 55 assembled with the output shaft 56 and the second sensor magnet 55*b* are prepared. As shown by arrow (1) in FIG. 7, the same side portion of the rotor assembly 36 as the worm 39 is caused to face the flange portion 53*a* of the gear case 51, and the worm 39 is inserted into the bearing attaching portion 53*c*. Next, with the first sensor magnet 42 inserted into the bearing attaching portion 53*c*, the outer wheel 40*a* of the ball bearing 40 is attached to the bearing attaching portion 53*c*, and the stopper spring 41 is further press-fitted to the bearing attaching portion 53*c*. Therefore, assembling of the rotor indenter 36 to the gear case 51 is completed. Here, for press-fitting the stopper spring 41 to the bearing attaching portion 53*c*, a cylindrical jig (not shown) which can press only the stopper spring 41 is used.

Then, as shown by arrow (2) in FIG. 7, a distal end side of the output shaft 56 is plugged into the boss portion 52*a* from inside of the gear case 51. At this time, the gear teeth 55*a* are caused to mesh with the worm teeth 39*a* by swinging the worm wheel 55 in a forward direction and a backward direction. In this manner, the worm wheel 55 is received at a normal position within the gear case 51. Thus, the worm 39 and the worm wheel 55 are housed in the gear case 51, namely, the reduction mechanism SD is housed, so that the first step is completed.

[Second Step]

In a second step, a work for housing the control board 70 for controlling the rotor 38 in the gear case 51 so as to be stacked on the reduction mechanism SD from a direction crossing the axial direction of the rotor 38 is performed.

First, before the control board 70 is housed in the gear case 51, as shown by arrow (3) in FIG. 8, the control board 70 is fixed inside the gear cover 60 by fixing screws (not shown). Here, the heat sink 78 is fixed to the control board 70 in advance, and the same side portion of the control board 70 as the heat sink 78 is caused to face the inside of the gear cover 60. Furthermore, distal end sides of the external connector connection terminals 74 are inserted inside the connector connection portion 61. Therefore, fixation of the control board 70 to the gear cover 60 is completed.

Next, as shown by arrow (4) in FIG. 9, the gear cover 60 fixed with the control board 70 is caused to face the opening portion 54 of the gear case 51 along the axial direction of the output shaft 56, and the gear cover 60 closes the opening portion 54. Here, while the control board 70 is directed to the opening portion 54, the distal end sides of the gear side feeding terminals 73U, 73V and 73W are opposed to the connector insertion hole 53*d* of the gear case 51. Then, the gear cover 60 is fixed to the gear case 51 by using three fastening screws (not shown). Therefore, the gear cover 60 is attached to the gear case 51 from the axial direction of the output shaft 56, so that the control board 70 is housed in the gear case 51 so as to be stacked on the reduction mechanism SD.

Here, a grease scattering preventing cover (not shown) for preventing grease (not shown) applied to the reduction mechanism SD from scattering toward the control board 70 is also fixed inside the gear cover 60 in advance. The grease scattering preventing cover is formed into a thin plate shape from plastic or the like, and it is disposed between the reduction mechanism SD and the control board 70 by attaching the gear cover 60 to the gear case 51.

[Third Step]

In a third step, a work for causing the motor case 31 (see FIG. 3) provided with the stator 32 having the coils 33 to face the gear case 51, and connecting the motor side feeding terminals 35U, 35V and 35W connected to the coils 33 to the respective gear side feeding terminals 73U, 73V and 73W provided on the control board 70 from the axial direction of the rotor 38 is performed.

As shown in FIG. 3, first of all, the motor unit 30 obtained by assembling the stator 32 to the motor case 31 in another assembling step is prepared. Next, as shown by arrow (5) in FIG. 9, the opening portion 31*c* of the motor case 31 is caused to face the flange portion 53a of the gear case 51 from the axial direction of the rotor 38 (rotation shaft 37). At this time, the motor connector portion 34b of the coil end collecting member 34 is inserted into the connector insertion hole 53d.

Subsequently, by moving the motor case 31 toward the gear case 51, the distal end sides of the gear side feeding terminals 73U, 73V and 73W of the control board 70 enter the respective slits SL (see FIG. 3) provided in the motor connector portion 34b. Then, by further moving motor case 31 toward the gear case 51, the distal end sides of the gear side feeding terminals 73U, 73V and 73W are electrically connected to the respective motor side feeding terminals 35U, 35V and 35W. By causing the flange portion 31d of the motor case 31 to abut on the flange portion 53a of the gear case 51, the gear side feeding terminals 73U, 73V and 73W, and the motor side feeding terminals 35U, 35V and 35W are completely connected to each other. Then, by screwing a pair of fastening screws (not shown) to the respective female screw portions 53b (see FIG. 5) of the gear case 51 while inserting the fastening screws into the respective screw holes 31e (see FIG. 3) of the motor case 31, the motor unit 30 and the gear portion 50 are coupled to each other, thereby resulting in completion of the brushless wiper motor 20.

Here, in the brushless wiper motor 20 which has been assembled, a positional relationship among the rotation shaft 37, the control board 70, and the motor connector portion 34b is put in a relationship as shown in FIGS. 10 and 11. FIG. 10 is a schematic view as viewed from the axial direction of the rotation shaft 37 and FIG. 11 is a schematic view as viewed from the axial direction of the output shaft 56.

As shown in FIG. 10, the distal end side of the output shaft 56 is positioned on a lower side in the FIG. 10, the rotation shaft 37, the control board 70, and the motor connector portion 34b are arranged in this order from the distal end side of the output shaft 56. That is, the rotation shaft 37 is arranged on the distal end side of the output shaft 56 sandwiching the control board 70, and the motor connector portion 34b is arranged on the opposite side of the distal end side of the output shaft 56 sandwiching the control board 70.

In such an arrangement relationship, since the control board 70 is housed in the gear case 51 before the gear side feeding terminals 73U, 73V and 73W and the motor side feeding terminal 35U, 35V and 35W are respectively connected to each other, it is unnecessary to provide a clearance (notch) for avoiding feeding terminals on the control board 70 like the conventional art. As shown by arrow OS in FIG. 11, the control board 70 may be moved closer to the motor connector portion 34b, thereby resulting in realization of further size reduction of the brushless wiper motor 20.

Thus, the control board 70 is disposed close to the rotation shaft 37 along the axial direction of the output shaft 56 and the motor connector portion 34b is disposed close to gear cover 60 along the axial direction of the output shaft 56. Therefore, the motor connector portion 34b can be arranged to the first rotation detecting sensors 76a, 76b and 76c so as to be stacked on the first rotation detecting sensor 76a, 76b and 76c in the axial direction of the output shaft 56 with the first rotation detecting sensors 76a, 76b and 76c arranged close to the first sensor magnet 42. That is, while the brushless wiper motor 20 is reduced in size, sensing precisions of the first rotation detecting sensor 76a, 76b and 76c are prevented from lowering.

As described above in detail, in the brushless wiper motor 20 according to this embodiment, the gear side feeding terminals 73U, 73V and 73W to which the motor side feeding terminals 35U, 35V and 35W provided on the end portion of the stator 32 in the axial direction are connected from the axial direction of the rotor 38 are provided on the control board 70 for controlling the rotor 38, and housed in the gear case 51 so as to be stacked on the reduction mechanism SD from a direction crossing in the axial direction of the rotor 38. Therefore, since the brushless wiper motor 20 is constituted in this manner, it is not necessary to provide the gear side feeding terminals 73U, 73V and 73W so as to avoid the control board 70. Therefore, electric noises are prevented from occurring from the wiper motor, and the brushless wiper motor can be further reduced in size and weight. In addition, since it is not necessary to provide a clearance in the control board 70, it is possible to improve degree of freedom for designing the control board 70.

Next, the second embodiment of the present invention will be described in detail with reference to the drawings, detail description about portions the same in function as those of the first embodiment is omitted, and those are denoted by the same reference characters as those of the first embodiment.

Figure 12:
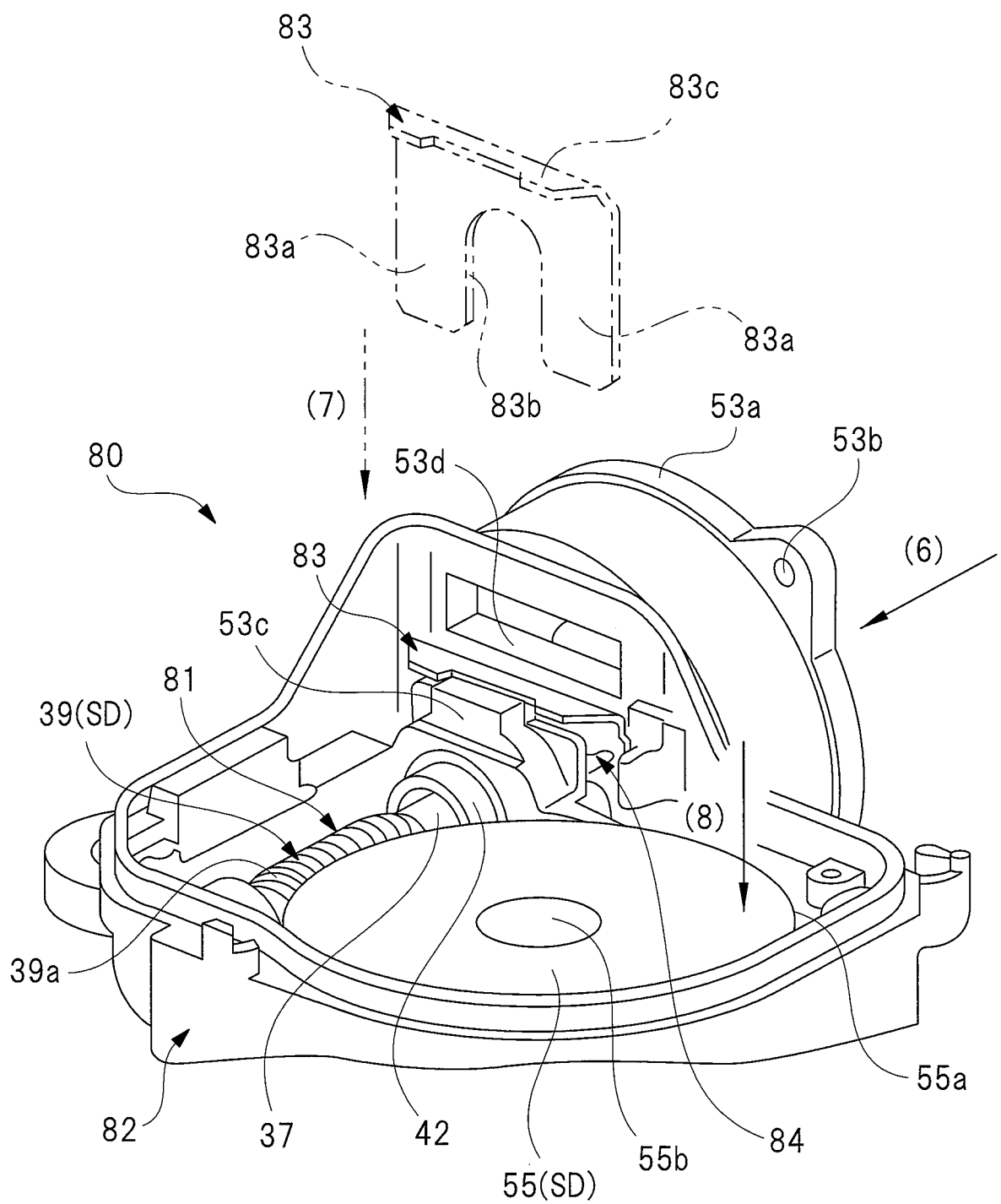
FIG. 12 is an explanatory view showing a brushless wiper motor of a second embodiment corresponding to FIG. 2.
Figure 13:
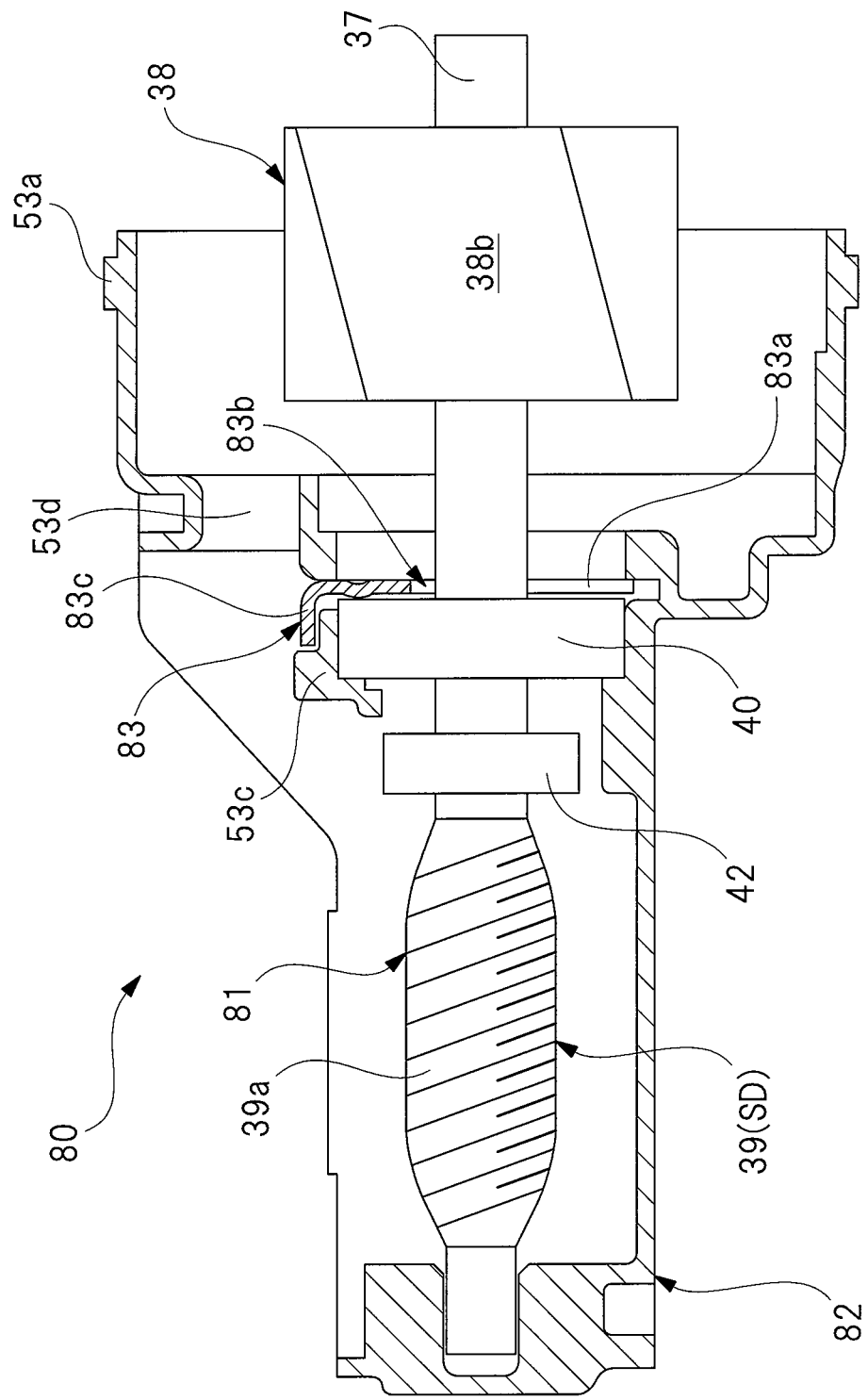
FIG. 13 a partial sectional view showing the brushless wiper motor of FIG. 12 taken along an axial direction of the rotation shaft.

FIG. 12 is an explanatory view of a brushless wiper motor of the second embodiment corresponding to FIG. 7, and FIG. 13 is a partial sectional view of the brushless wiper motor of FIG. 12, taken along an axial direction of a rotation shaft.

As shown in FIGS. 12 and 13, a brushless wiper motor 80 according to the second embodiment is different from that of the first embodiment in structure of a rotor assembly 81 and assembling procedure of the rotor assembly 81 to a gear case 82. Specifically, in the first embodiment, as shown in FIG. 7, the rotor assembly 36 is fixed to the gear case 51 by integrally providing the rotor assembly 36 with the annular stopper spring 41, and press-fitting the stopper spring 41 into the bearing attaching portion 53c while attaching the ball bearing 40 to the bearing attaching portion 53c.

On the other hand, in the second embodiment, as shown in FIGS. 12 and 13, by using a stopper member 83 separated from the rotor assembly 81, the ball bearing 40 is fixed to the bearing attaching portion 53c. Here, the stopper member 83 is fixed to a stopper member attaching portion 84 provided in the vicinity of the bearing attaching portion 53c of the gear case 82 by press-fitting.

The stopper member 83 is formed into an approximately U-shape by pressing a steel plate or the like. The stopper member 83 has a pair of bearing pushing portions 83a which is plugged into the stopper member attaching portion 84. A notch portion 83b for avoiding interference with the rotation shaft 37 is provided between the pair of bearing pushing portions 83a. Furthermore, the stopper member 83 is provided with a jig pad portion 83c pushed down by a pushing jig (not shown) when the bearing pushing portions 83a are respectively plugged into the stopper member attaching portion 84. An extending direction of the jig pad portion 83c is directed in a direction approximately perpendicular to an extending direction of the respective bearing pushing portions 83a.

In order to assemble the rotor assembly 81 to the gear case 82, first, as shown by an arrow (6) in FIG. 12, the worm 39 of the rotor assembly 81 is caused to face the flange portion 53a of the gear case 82, and the worm 39 is inserted into the bearing attaching portion 53c. Then, while the first sensor magnet 42 is inserted into the bearing attaching portion 53c, the outer wheel 40a (see FIG. 7) of the ball bearing 40 is attached to the bearing attaching portion 53c. Then, as shown by a double dotted line arrow (7) in FIG. 12, the stopper member 83 is caused to face the stopper member attaching portion 84 in a direction crossing the axial direction of the rotation shaft 37. Then, while the pushing jig is caused to abut on the jig pad portion 83c, the stopper member 83 is pushed toward the stopper member attaching portion 84. In this manner, as shown in FIG. 13, the ball bearing 40 is clamped between the bearing attaching portion 53c and the stopper member 83 along the axial direction of the rotation shaft 37, thereby resulting in completion of assembling of the rotor assembly 81 to the gear case 82.

Next, as shown by an arrow (8) in FIG. 12, the distal end side of the output shaft 56 (see FIG. 7) is plugged into the boss portion 52a (see FIG. 6) from the inside of the gear case 82. At this time, by swinging the worm wheel 55 in forward and reverse directions, the gear teeth 55a are caused to mesh with the worm teeth 39a. In this manner, the worm wheel 55 is housed at a normal position in the gear case 82, and the reduction mechanism SD composed of the worm 39 and the worm wheel 55 is housed in the gear case 82.

In the second embodiment formed in the above manner, operation and effects similar to those of the first embodiment can be achieved. In addition, in the second embodiment, since the stopper member 83 is attached to the stopper member attaching portion 84 in the direction crossing the axial direction of the rotation shaft 37, even if a large axial force is applied to the rotation shaft 37 during operation of the reduction mechanism SD, it is possible to securely prevent irregular movement of the rotation shaft 37 in the axial direction thereof or accidental wobbling thereof.

Next, the third embodiment of the present invention will be described in detail with reference to the drawings, detail description about portions the same in function as those of the second embodiment is omitted, and those are denoted by the same reference characters as those of the third embodiment.

Figure 14:
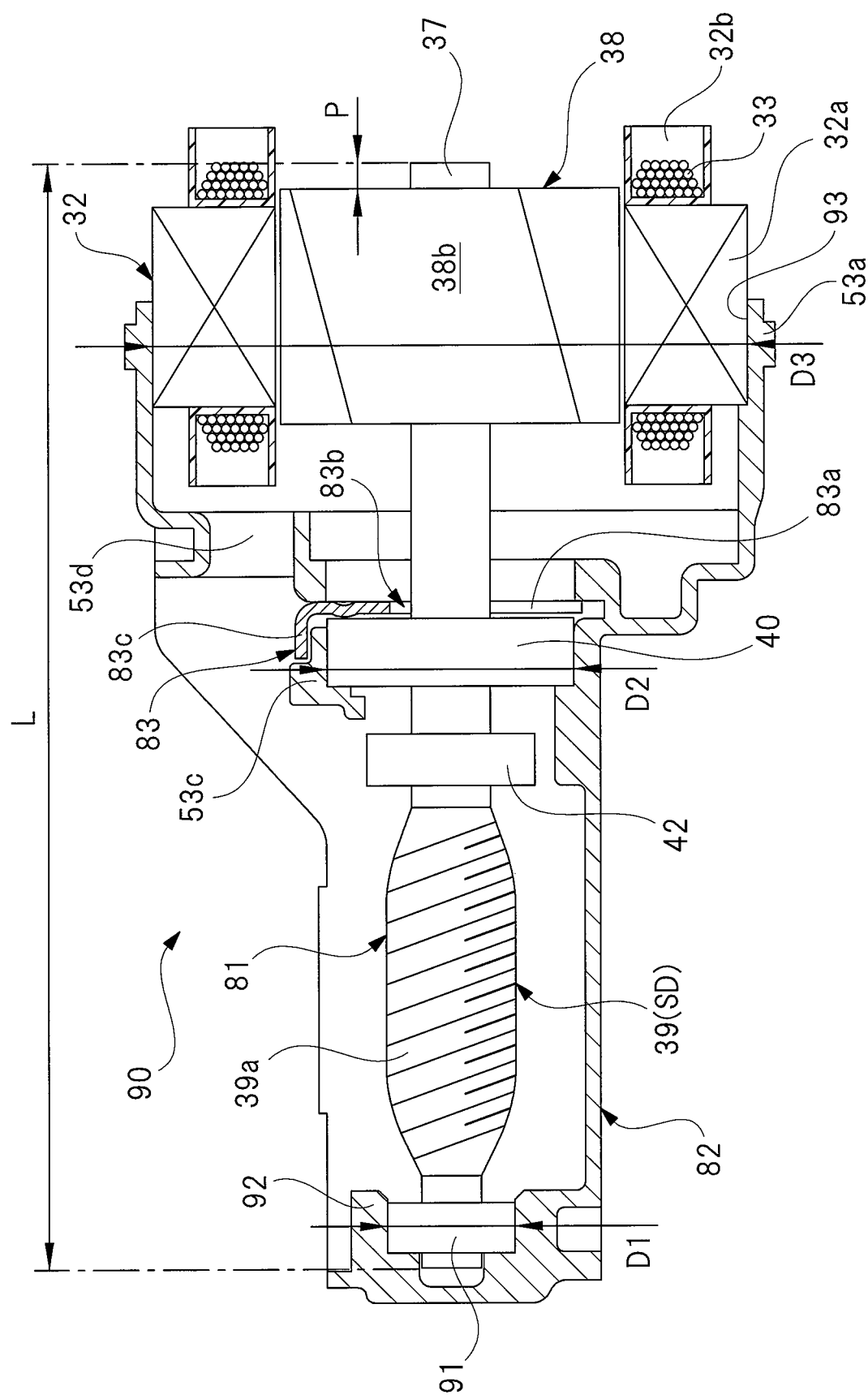
FIG. 14 is an explanatory view showing a brushless wiper motor of a third embodiment corresponding to FIG. 13.

FIG. 14 is an explanatory view of a brushless wiper motor of a third embodiment corresponding to FIG. 13.

As shown in FIG. 14, a brushless wiper motor 90 according to the third embodiment is different from that of the second embodiment in that a distal end side ball bearing 91 is attached to a distal end of the worm teeth 39a in an axial direction of the rotation shaft 37, and one portion of the stator 32 along an axial direction thereof is press-fitted into one portion of the gear case 82, which is on the same side as the flange portion 53a in a radial direction thereof.

The distal end side ball bearing 91 is the same in structure as the ball bearing 40. A radial size D1 of the distal end side ball bearing 91 is set to be smaller than a radial size D2 of the ball bearing 40 (D1<D2). Therefore, at an assembling time of the brushless wiper motor 90, the distal end side ball bearing 91 can pass through the bearing attaching portion 53c attached with the ball bearing 40.

In addition, the distal end side ball bearing 91 is attached to a distal end side bearing attaching portion 92 which is provided inside the gear case 82. The distal end side bearing attaching portion 92 is axially aligned with the bearing attaching portion 53c. Therefore, even if an axial deviation occurs in the worm teeth 39a during operation of the brushless wiper motor 90, the rotation shaft 37 can be rotated smoothly, thereby resulting in realization of further noise reduction of the brushless wiper motor 90.

The brushless wiper motor 90 is a brushless motor of an inner rotor type, and it does not have a brush and a commutator as well as a coil around the rotor 38. Therefore, the ball bearing 40 can be fixed to an approximately central portion of the rotation shaft 37 along the axial direction thereof, while shortening the axial length "L" of the rotation shaft 37. Therefore, it is unnecessary to provide a bearing such as ball bearing on the same side of the rotation shaft 37 as the rotor 38 along the axial direction of the rotation shaft 37. Specifically, the rotation shaft 37 of the brushless wiper motor 90 has a cantilever structure. Incidentally, such a cantilever structure is also similar to those of the above first and second embodiments.

Here, for fixing a rotor to a rotation shaft, a fixing method of partially forming a projecting member (knurl) projected outside in a radial direction on an outer periphery of the rotation shaft at a predetermined region along the axial direction of the rotation shaft and press-fitting the rotor to the projecting member is adopted in order to shorten a press-fitting length of the rotor to the rotation shaft. On the other hand, in the brushless wiper motor 90, since a bearing is not provided on the same side as the rotor 38 of the rotation shaft 37, a projecting amount "P" of the rotation shaft 37 from the rotor 38 is reduced due to a bearing which is not provided. Therefore, since a press-fitting length of the rotor 33 to the rotation shaft 37 is short, fixation can be achieved by simply press-fitting the rotor 38 to the rotation shaft 37. Therefore, a step of working the projecting portion can be omitted and a coaxial degree of the rotor 38 to the rotation shaft 37 can be improved.

A stator fixing portion 93 is provided inside one portion of the gear case 82, which is on the same side as the flange portion 53a in a radial direction thereof. The stator 32 has a diameter "D3", and an approximately half portion of the stator 32 along the axial direction thereof is fixed to the stator fixing portion 93 by press-fitting. In addition, the diameter D3 of the stator 32 is set to be two times or more as large as the diameter D1 of the ball bearing 40 (D3>2× D2), and the stator 32, the distal end side ball bearing 91, and the ball bearing 40 are arranged coaxially with one another.

Here, at the time of cutting the inside of the gear case 82, the distal end side bearing attaching portion 92, the bearing attaching portion 53c, and the stator fixing portion 93 are formed with high precision, and coaxial with one another. Specifically, with the gear case 82 chucked to a chuck apparatus (not shown), the distal end side bearing attaching portion 92, the bearing attaching portion 53c, and the stator fixing portion 93 are sequentially formed by drilling. Therefore, the distal end side bearing attaching portion 92, the bearing attaching portion 53c, and the stator fixing portion 93 are arranged coaxially with one another with high precision. Therefore, the coaxial degree of the rotor 38 and the stator 32 is secured with high precision, and it is possible to reduce a clearance between an outer circumference of the rotor 38 and an inner circumference of the stator 32 without being caused to contact with each other, and to realize a brushless wiper motor 90 having high efficiency.

However, the distal end side bearing 91 and the ball bearing 40 may be fixed to the distal end side bearing attaching portion 92 and the bearing attaching portion 53c by press-fitting, and in this case, the coaxial degree between the rotation shaft 37 (rotor 38) and the stator 32 is further improved. Furthermore, if the coaxial degree among the distal end side bearing attaching portion 92, the bearing attaching portion 53c, and the stator fixing portion 93 is obtained sufficiently, engagement of spigot joint may be adopted so as to prevent mutual rotation without press-fitting the stator 32 to the stator fixing portion 93. In this case, it is possible to suppress occurrence of cutting debris (iron powder) during press-fitting.

In the third embodiment formed in the above manner, in addition to the various operations and effects described above, operation and effects similar to those of the second embodiment can be achieved.

It goes without saying that the present invention is not limited to the above embodiments, and the present invention can be variously modified without departing from the gist of the present invention. In the above embodiments, the motor case 31 is made of a steel plate, and the gear cases 51 and 82 is made of aluminum, but the present invention is not limited to this case, and the motor case 31 and the gear cases 51 and 82 may be made of aluminum. In this case, the heat radiation performance of the whole brushless wiper motors 20, 80 and 90 can be further improved.

In addition, in the above embodiments, as the motor side feeding terminals 35U, 35V and 35W, the "female type terminals" are adopted, while the "male type terminals" are adopted as the gear side feeding terminals 73U, 73V and 73W, but the present invention is not limited to this case, and as the motor side feeding terminals 35U, 35V and 35W, the "male type terminals" may be adopted, while the "female type terminals" may be adopted as the gear side feeding terminals 73U, 73V and 73W.

Furthermore, in the above-mentioned embodiments, the wiper apparatus 12 is provided with the power transmission mechanism 14, but the present invention is not limited to this, and it may be made unnecessary to have the power transmission mechanism 14 in the course of transmission of the swinging motion of the brushless wiper motor 20, 80, or 90 to the respective pivot shafts 13a and 13b. In this case, brushless wiper motors corresponding to the respective pivot shafts 13a and 13b are provided in order to transmit power to the respective pivot shafts 13a and 13b.

Furthermore, in the above embodiments, the brushless wiper motor 20, 80, or 90 is applied as a driving source of the wiper apparatus 12 wiping the front windshield 11 of the vehicle 10, but the present invention is not limited to this example, and it can also be applied to a driving source of a rear wiper apparatus of a vehicle, or a driving source of a wiper apparatus of a railway vehicle, a ship, a construction machine or the like.

The brushless wiper motor is used as a driving source of a wiper apparatus mounted on a vehicle such as automotive vehicle, and it is used to drive a wiper arm in a swinging manner to wipe rain water or the like attached to a windshield.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A brushless wiper motor for driving a wiper member in a swinging manner, the brushless wiper motor comprising:
    a motor case in which a stator having a coil is housed;
    a rotor provided inside the stator;
    a motor side feeding terminal provided to an end portion of the stator from an axial direction of the stator, and connected to the coil;
    a gear case in which a gear mechanism for transmitting rotation of the rotor to the wiper member is housed, the gear case having a flange portion to be connected to the motor case;
    a connector insertion hole which is formed so as to open in an axial direction of the rotor at a position offset from an axial center of the flange portion, and in which the motor side feeding terminal is inserted;
    a control board configured for controlling the rotor, the control board being housed in the gear case so as to coincide with the gear mechanism in a direction crossing the axial direction of the rotor; and
    a gear side feeding terminal provided on one surface of the control board and connected to the motor side feeding terminal from the axial direction of the rotor through the connector insertion hole, an opposite surface of the one surface of the control board facing the gear mechanism,
    wherein the control board is disposed between a rotation shaft for the rotor and the motor side feeding terminal when the control board is viewed from the axial direction of the rotor, and
    wherein the gear side feeding terminal is provided on one side face of the control board on the opposite side of the control board from the gear mechanism, and a rotation sensor for detecting a rotation state of the rotor is provided on the other side face of the control board on the same side of the control board as the gear mechanism.

2. The brushless wiper motor according to claim 1, wherein the control board comprises a CPU arranged thereon.

* * * * *